United States Patent [19]

Yuasa et al.

[11] Patent Number: 4,843,465
[45] Date of Patent: * Jun. 27, 1989

[54] PICTURE TRANSMISSION SYSTEM USING SECONDARY DIFFERENTIAL VARIABLE SAMPLING RATE CODING

[75] Inventors: Hiroyoshi Yuasa, Hirakata; Koichi Omura, Osaka, both of Japan

[73] Assignee: Matsushita Electric Works Ltd., Osaka, Japan

[*] Notice: The portion of the term of this patent subsequent to Oct. 27, 2004 has been disclaimed.

[21] Appl. No.: 106,079

[22] Filed: Oct. 7, 1987

Related U.S. Application Data

[63] Continuation of Ser. No. 726,717, Apr. 24, 1985, Pat. No. 4,703,348.

[30] Foreign Application Priority Data

| | | | |
|---|---|---|---|
| Apr. 25, 1984 | [JP] | Japan | 59-83146 |
| Jun. 25, 1984 | [JP] | Japan | 59-130582 |
| Jun. 25, 1984 | [JP] | Japan | 59-130583 |

[51] Int. Cl.$^4$ .................................................. H04N 7/12
[52] U.S. Cl. ..................................... 358/133; 358/135; 358/136; 375/27
[58] Field of Search .................. 358/133, 135, 136, 260, 358/261, 138; 375/27

[56] References Cited

U.S. PATENT DOCUMENTS

| | | | |
|---|---|---|---|
| 3,679,821 | 7/1972 | Schroeder | 358/136 |
| 4,281,344 | 7/1981 | Mounts et al. | 358/136 |
| 4,292,651 | 9/1981 | Kretz et al. | 358/135 |
| 4,493,074 | 1/1985 | Walter et al. | 370/119 |
| 4,498,102 | 2/1985 | Richard et al. | 358/133 |
| 4,571,618 | 2/1986 | Hatori et al. | 358/136 |
| 4,626,828 | 12/1986 | Nishitani | 358/135 |
| 4,691,233 | 9/1987 | Acampora | 358/136 |

FOREIGN PATENT DOCUMENTS

| | | |
|---|---|---|
| 3111823 | 3/1982 | Fed. Rep. of Germany. |
| 178874 | 10/1984 | Japan. |

OTHER PUBLICATIONS

Mitrakos et al, "Nonlinear Image Processing for Optimum Composite Source Coding", IEE Proc., vol. 130, pt. G, No. 5, Aug. 1983.
Kawade et al, "A Variable Sampling Rate Coding Technique", UDC 621.394: 621.397.2: 654.173, pp. 97–104.

Primary Examiner—James J. Groody
Assistant Examiner—John K. Peng
Attorney, Agent, or Firm—Joseph G. Seeber

[57] ABSTRACT

A picture transmission system of the present invention is adapted to code picture data by a variable sampling rate coding system to transmit the same. Picture data are stored in a frame memory (16) of a transmission area so that differential values between the same and predictors from a predictive circuit (43) are obtained by a subtracter (41) and compression-coded by a variable sampling rate compression circuit (42) to be transmitted. The compression-coded differential values are expansion-decoded by a variable sampling rate expansion circuit (40) so that original differential values are supplied to an adder (45). The adder (45) adds up the differential values with predictors, to produce predictors for subsequent sampling points. In a receiving area, transmitted codes are expansion-decoded by a variable sampling rate expansion circuit (51), so that the decoded values are added up with predictors from a predictive circuit (53) by an adder (52) to output the original picture data. Preposition prediction and variable sampling rate decoding are thus combined to enable, in the receiving area, automatic correction of compression/expansion errors caused in the transmission area.

16 Claims, 8 Drawing Sheets

PICTURE TRANSMISSION SYSTEM USING SECONDARY DIFFERENTIAL VARIABLE SAMPLING RATE CODING

This application is a continuation, of application Ser. No. 726,717, filed Apr. 24, 1985 now U.S. Pat. No. 4,703,348.

BACKGROUND OF THE INVENTION

1. Field of the Invention

The present invention relates to a picture transmission system. More specifically, it relates to a picture transmission system adapted to a visual telephone and the like, which transmits variable-density pictures through a public telephone line and the like by a variable sampling rate system.

2. Description of the Prior Art

In a visual telephone, picture information is generally subjected to band compression coding for transmitting variable-density still pictures. Such band compression coding is performed by methods utilizing intraframe correlation and interframe correlation. The methods utilizing the intraframe correlation include differential pulse-code modulation (DPCM) of predicting subsequent sampling values from some sampling values for coding predictive errors thereof to transmit the same and a variable sampling rate coding system.

In such a visual telephone, predictive errors which are nonlinearly quantized by DPCM are inevitably required to be in excess of 4 bits for obtaining practical restored pictures, leading to reduction in the compression effect.

On the other hand, the variable sampling rate coding system is adapted to compress preposition predictive errors further in the time base direction to transmit the same, and is remarkably effective for improving compression efficiency. Description is now made of the variable sampling rate coding system.

FIGS. 1 and 2 are schematic block diagrams showing principle structure of a conventional variable sampling rate coding system, and FIG. 3 is an illustration showing an example of variable sampling rate coding.

Referring now to FIG. 1, input signals are subjected to subtraction by predictive decoding signals supplied from a local predictive decoding circuit 1 and a subtractor 2, whereby error signals are supplied to a variable sampling rate coding circuit 3. This variable sampling rate coding circuit 3 has such a quantization characteristic as shown in FIG. 3. Namely, the variable sampling rate coding circuit 3 defines relations between sampling periods and sampling values in the form of triangles, which are scrolled in the horizontal direction on the screen as shown in FIG. 3. In this case, time difference values are increased as amplitude difference values are reduced, followed by increase in compressibility. To the contrary, compressibility is lowered in positions in which the amplitude difference values are large and time difference values are small. Thus, the relations between the sampling periods and the sampling values are defined by the triangles, whereby differences as indicated by arrows are transmitted as coding output series through a buffer memory 4. The coding amplitude components are supplied to the local predictive decoding circuit 1, to be subjected to feedback to the subtractor 2 as amplitude predictive decoding signals.

On the other hand, the received coding amplitude components are supplied to an amplitude predictive decoding circuit 6 and a sampling point decoding circuit 7 through a buffer memory 5 as shown in FIG. 2. The sampling point decoding circuit 7 has the same characteristics as the variable sampling rate coding circuit 3, and creates sampling space components from the transmitted coding amplitude components, for integrating the same to regenerate sampling point signals. The sampling point signals and amplitude signals decoded from the amplitude predictive decoding circuit 6 are supplied to a sampling point regenerative circuit 8, which in turn regenerates sampling points determined by the both signals. The regenerated sampling points are supplied to an interpolation circuit 9, which in turn performs appropriate interpolation (e.g., linear interpolation) thereby to regenerate signals.

The aforementioned variable sampling rate system is remarkably effective for improving compression efficiency, whereas lowered is the quality of pictures by errors. In other words, in the variable sampling rate system, the quantized sampling series itself includes information on sampling points (time difference values), and the time difference values are increased as the sampling values are reduced, as is obvious from FIG. 3. The compressibility is increased when the sampling values are thus small, and hence errors horizontally caused with increased compressibility are inevitably propagated in the horizontal direction. Consequently, outlines of the pictures regenerated in the receiving area are made irregular along respective scanning lines, leading to deterioration in the picture quality.

SUMMARY OF THE INVENTION

Accordingly, the principal object of the present invention is to provide a picture transmission system which can improve compression efficiency and remove errors caused in coding, thereby to transmit pictures of good quality.

Briefly stated, the present invention performs prediction on the basis of sampling values obtained by sampling picture data and predictive values by outputting differential values between the sampling values and the predictive values for compression-coding the differential values outputted by the prediction in a variable sampling rate system to transmit the same and expansion-decoding the compression-coded differential values in the variable sampling rate system, thereby to process the values thus decoded as predictors for subsequent sampling points.

Therefore, according to the present invention, compression coding and expansion decoding in the variable sampling rate system are performed within the predictive loop thereby to transmit predictive differential values including errors following compression and expansion in the variable sampling rate coding system, whereby the errors caused in the variable sampling rate coding system are automatically corrected when samples are restored in the receiving area by employing the differential values.

In a preferred embodiment of the present invention, only changed areas in picture data and subsequent picture data are predicted and coded, whereby no transmission is required for unchanged portions, leading to reduction in time for picture transmission.

In another embodiment of the present invention, prediction is successively performed for respective sampling points on one horizontal scanning line (or in the vertical direction) in picture data to store differential values between the respective sampling points and the respective predictors, thereby to successively perform preposition prediction in the vertical direction (or along the horizontal scanning lines) on the basis of the stored differential values and sampling values of the respective sampling points in a subsequent horizontal scanning line portion (or in the vertical direction) so as to perform compression coding of the same on the basis of the differential values obtained by the preposition prediction.

Therefore, according to this second embodiment of the present invention, preposition prediction is performed on the respective sampling points in the picture data on one horizontal scanning line to store the differential values thereof, and hence the stored differential values have vertical correlation orthogonal to the scanning direction, whereby compression efficiency of the picture data can be improved by finding differences between the stored differential values and sampling values of respective sampling points in the subsequent horizontal scanning line to concentrate the differential values around zero.

Further, in still another embodiment of the present invention, a plurality of bits of picture data are divided into high-order bits and low-order bits, so as to perform preposition prediction of high-order bits for coding the same in the variable sampling rate coding system. The picture data are thus divided to strengthen correlation between adjacent picture elements of high-order bits and improve efficiency of information compression, whereby transmission time is reduced.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
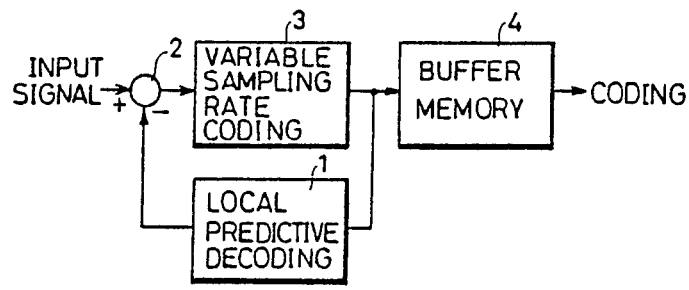
FIGS. 1 and 2 are schematic block diagrams showing principle structure of a conventional variable sampling rate coding system.
Figure 2:
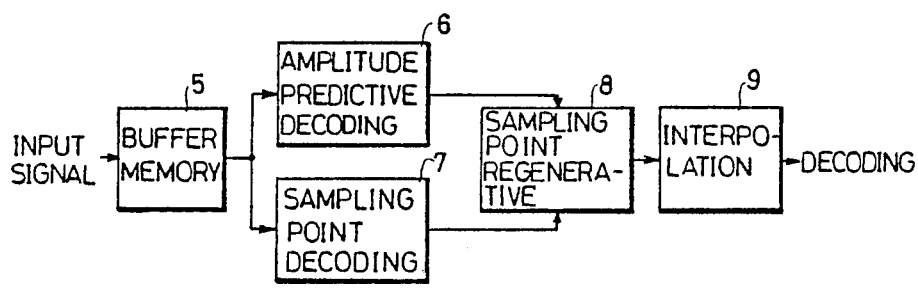
Figure 3:
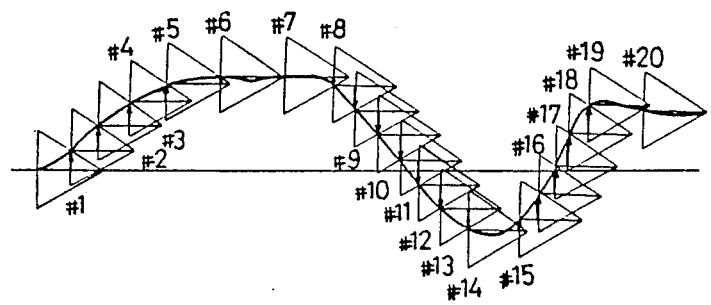
FIG. 3 is an illustration showing an example of variable sampling rate coding.
Figure 4:
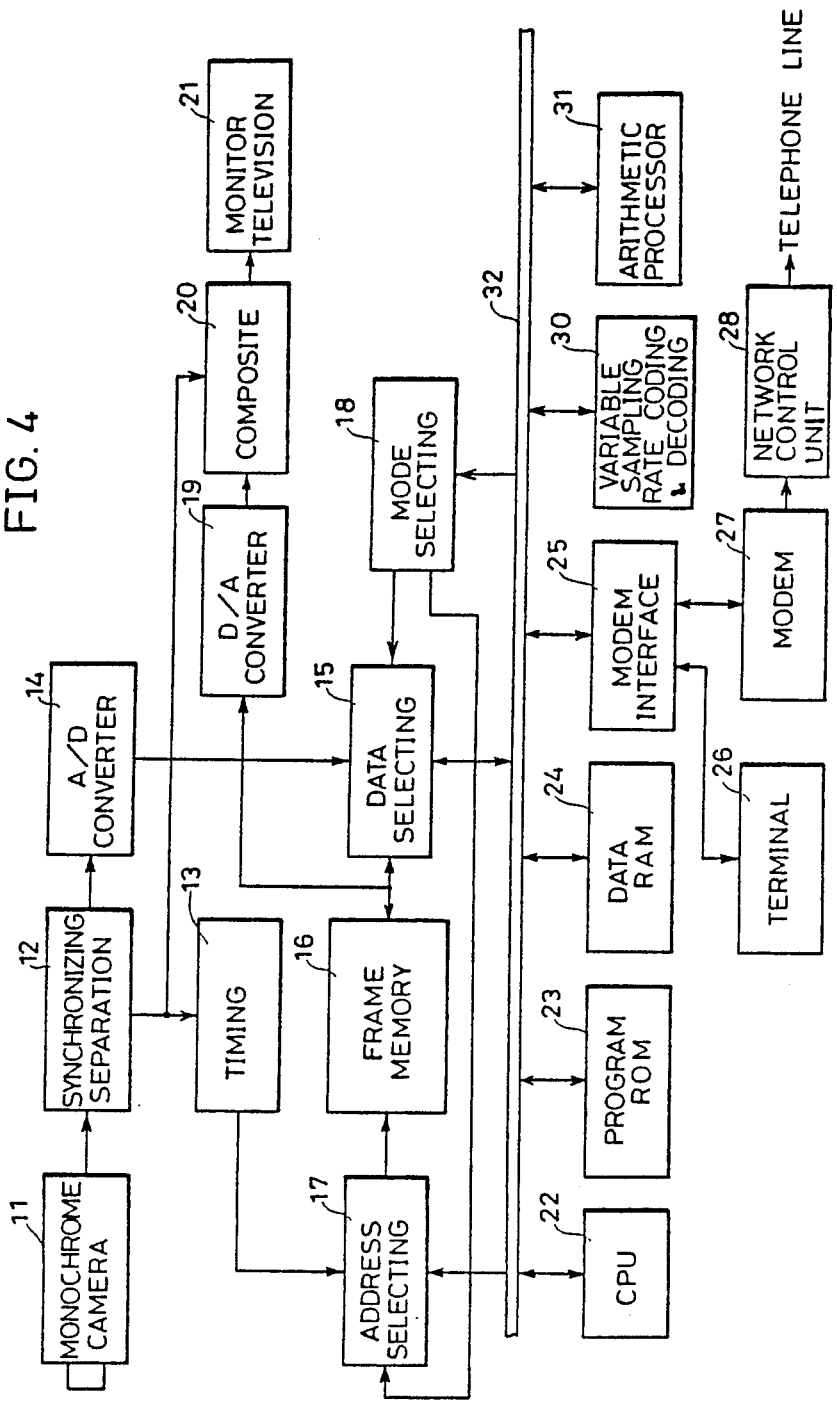
FIG. 4 is a schematic block diagram showing an example of a visual telephone set to which an embodiment of the present invention is applied.

FIG. 4 is a schematic block diagram showing an example of a visual telephone set to which an embodiment of the present invention is applied Referring to FIG. 4, structure of the visual telephone set is now described. A monochrome camera 11 is adapted to pick up pictures, so as to supply composite picture signals of the same to a synchronizing separation circuit 12. The synchronizing separation circuit 12 separates synchronizing signals from the composite picture signals thereby to supply the separated synchronizing signals to a timing circuit 13 while supplying the picture signals, from which the synchronizing signals are separated, to an A-D converter 14. The A-D converter 14 samples and quantizes the picture signals to output digital signals, which are supplied to a frame memory 16 through a data selector 15. On the other hand, the timing circuit 13 counts the synchronizing signals, thereby to supply the frame memory 16 with address signals through the address selector 17. The frame memory 16 stores the picture signals digitalized by the A-D converter 14 on the basis of the address signals outputted from the timing circuit 13.

The data selector 15 and the address selector 17 are switched by a mode selector 18. In transmission, the mode selector 18 switches the data selector 15 to the A-D converter 14 side while switching the address selector 17 to the timing circuit 13 side. In receiving, the mode selector 18 switches the data selector 15 to a D-A converter 19 side while switching the address selector 17 to the timing circuit 13 side. In compression and expansion of picture data, further, the mode selector 18 switches the data selector 15 and the address selector 17 to data bus 32 sides respectively.

The data bus 32 is connected with a CPU 22, a program ROM 23, a data RAM 24, a modem interface 25, a variable sampling rate coding/decoding circuit 30 and an arithmetic processor 31. The CPU 22 is adapted to control the entire visual telephone set on the basis of programs stored in the program ROM 23, and the data RAM 24 is adapted to store various data. The modem interface 25 is connected with a terminal 26 and a modem 27, which in turn is connected with a public telephone line through a network control unit 28.

In transmission, the mode selector 18 switches the data selector 15 and the address selector 17 to the data bus 32 side on the basis of commands from the CPU 22. The CPU 22 in turn supplies the frame memory 16 with address signals through the address selector 17. The frame memory 16 reads out stored picture data on the basis of the said address signals. The picture data thus read are inputted through the data selector 15 and the data bus 32 in the variable sampling rate coding/decoding circuit 30, which codes the picture data by a variable sampling rate coding system. The coded picture data are transmitted through the data bus 32, the modem interface 25, the modem 27, the network control unit 28 and the public telephone line.

In receiving, picture data transmitted through the public telephone line are inputted in the network control unit 28. The picture data are further inputted in the variable sampling rate coding/decoding circuit 30 through the network control unit 28, the modem 27, the modem interface 25 and the data bus 32, to be decoded to the original picture data. The decoded picture data are stored in the frame memory 16 through the data selector 15. The picture data thus stored in the frame memory 16 are read on the basis of the address signals outputted from the timing circuit 13, to be supplied to the D-A converter 19. The D-A converter 19 converts the picture data into analog signals, to supply the same to a synchronizing composite circuit 20. The synchronizing composite circuit 20 adds synchronizing signals to the analog-converted picture signals to supply the same to a monitor television 21, which thereby displays pictures based on the received picture data.

Figure 5:
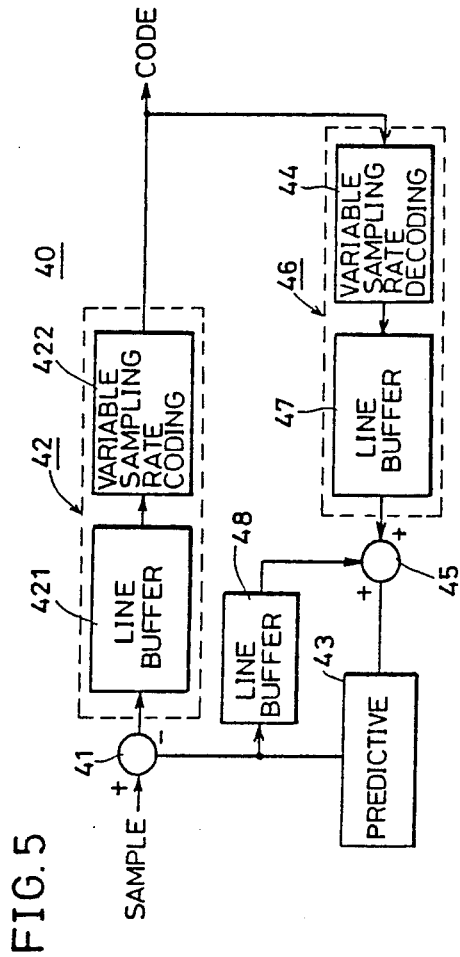
FIG. 5 is a schematic block diagram of a compression coding circuit included in the embodiment of the present invention.
Figure 6:
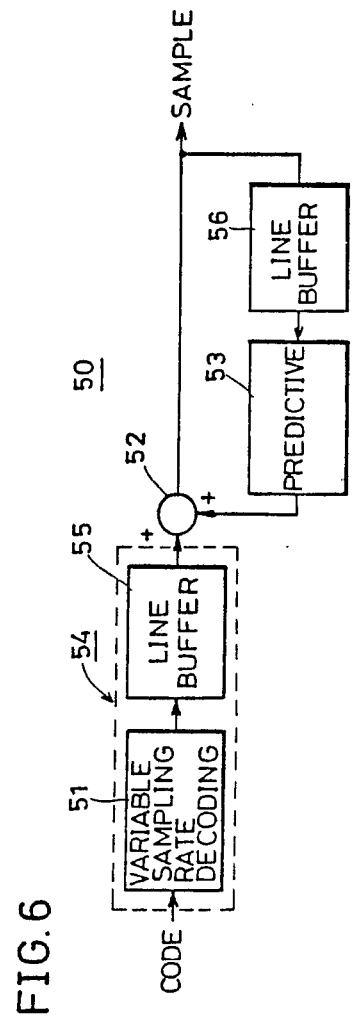
FIG. 6 is a schematic block diagram of an expansion decoding circuit included in the embodiment of the present invention.

FIG. 5 is a schematic block diagram showing a compression coding circuit included in the embodiment of the present invention, and FIG. 6 is a schematic block diagram showing an expansion coding circuit also included in the same.

A compression coding circuit 40 and an expansion coding circuit 50 shown in FIGS. 5 and 6 are included in the aforementioned variable sampling rate coding/decoding circuit 30 as shown in FIG. 4 respectively. Description is now made on structure of the compression coding circuit 40 as shown in FIG. 5. The picture data read from the aforementioned frame memory 16 as shown in FIG. 4 are supplied as sampling values to a subtraction circuit 41. The subtraction circuit 41 performs subtraction of the inputted sampling values and predictors from a predictive circuit 43, thereby to supply differential values thereof to a variable sampling rate compression circuit 42. This variable sampling rate compression circuit 42 is formed by a line buffer 421 and a variable sampling rate coding circuit 422.

The line buffer 421 stores the differential values which are outputted from the subtraction circuit 41, while the variable sampling rate coding circuit 422 codes the differential values stored in the line buffer 421 by the variable sampling rate coding system. The coded data are outputted to the aforementioned data bus 32 as shown in FIG. 4, as well as supplied to a variable sampling rate decoding circuit 44. This variable sampling rate decoding circuit 44 is adapted to decode the coded data to the original differential values to store the same in the line buffer 47, for decoding differential values by one line. The decoded differential values are supplied to an adder circuit 45, which in turn adds up the decoded differential values and predictors supplied from the predictive circuit 43 through the line buffer 48, thereby to supply the added values as predictors for subsequent sampling points to the predictive circuit 43.

Description is now made on the expansion decoding circuit 50 with reference to FIG. 6. This expansion decoding circuit 50 is adapted to decode codes transmitted in receiving from the public telephone line to sampling values. Therefore, the expansion decoding circuit 50 includes a variable sampling rate decoding circuit 51, an adder circuit 52, a predictive circuit 53 and line buffers 55 and 56. The variable sampling rate decoding circuit 51 decodes inputted codes to differential values. The differential values thus decoded by the variable sampling rate decoding circuit 51 are supplied to the adder circuit 52 through the line buffer 55. The adder circuit 52 is supplied with predictors from the predictive circuit 53, and adds up the decoded differential values and the predictors thereby to output sampling values while storing the same in the line buffer 56.

Figure 7:
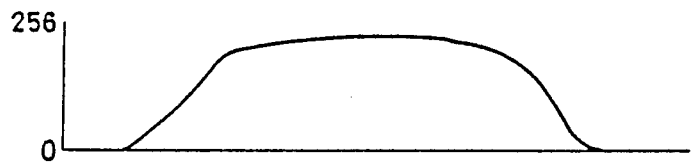
FIGS. 7 and 8 are waveform diagrams for illustrating operations of the embodiment of the present invention.
Figure 8:
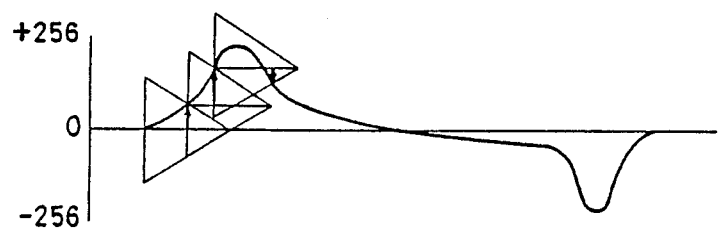

FIGS. 7 and 8 are waveform diagrams for illustrating operations of the embodiment of the present invention. Operations of the compression coding circuit 40 and the expansion decoding circuit 50 are now described with reference to FIGS. 5 to 8. The frame memory 16 stores picture data obtained by digitization of picture signals as shown in FIG. 7. Such picture data are coded by the compression coding circuit 40. In other words, sampling values of the picture data are subjected to subtraction by the subtractor 41 with predictors from the predictive circuit 43, whereby obtained differential values are stored in the line buffer 421. The variable sampling rate coding circuit 422 defines relations between sampling periods and the sampling values in the form of triangles as shown in FIG. 8, thereby to code differences indicated by arrows and transmit the same. These codes are decoded to the original differential values by the variable sampling rate decoding circuit 44 to be stored in the line buffer 47. The differential values thus stored in the line buffer 47 are added with the predictors from the predictive circuit 43 by the adder circuit 45, to produce predictors for subsequent sampling points.

In the receiving area, the variable sampling rate decoding circuit 51 of the expansion decoding circuit 50 as shown in FIG. 6 decodes the coded data, whereby the original differential values are restored and stored in the line buffer 55. The differential values thus stored in the line buffer 55 are added with predictors from the predictive circuit 53 by the adder circuit 52, so that original picture data are decoded and outputted. The decoded data are stored in the line buffer 56, to be supplied to the adder circuit 52 as predictors for decoding subsequent codes by the predictive circuit 53.

Thus, in the compression coding circuit 40 as shown in FIG. 5, the variable sampling rate compression circuit 42 and the variable sampling rate decoding circuit 44 are inserted in the predictive loop thereof, whereby errors following compression and expansion are included in predictive differential values in the variable sampling rate coding system and transmitted. Therefore, the errors in the variable sampling rate coding system are automatically corrected when samples are restored utilizing the differential values in the receiving area.

Figure 9:
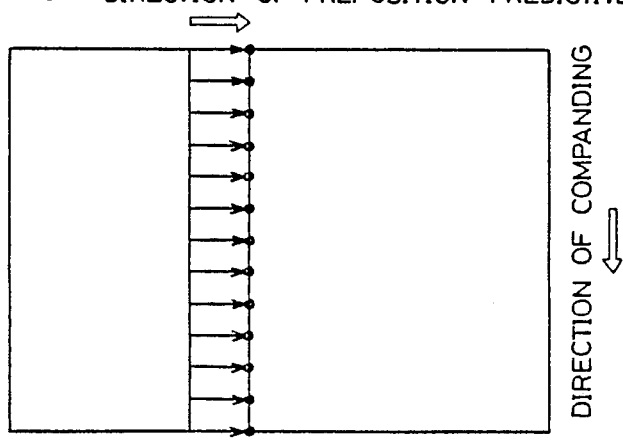
FIG. 9 is an illustration showing a manner of horizontally preposition-predicting a screen scanned in the horizontal direction and vertically coding predicted differences arranged in the vertical direction in a variable sampling rate system.

FIG. 9 is an illustration showing a manner of horizontally preposition-predicting a screen scanned in a horizontal direction thereby to vertically perform variable sampling rate coding of predictive errors arranged in the vertical direction.

Description is now made on an embodiment for transmitting two-dimensional plane pictures as shown in FIG. 9 by the compression coding circuit 40 as shown in FIG. 5. The predictive circuit 43 of the compression coding circuit 40 as shown in FIG. 5 successively supplies the subtraction circuit 41 with predictors corresponding to respective sampling points on one horizontal scanning line, while storing the same in the line buffer 48. The subtraction circuit 41 successively subtracts predictors from respective sampling values of picture data on one horizontal scanning line thereby to output differential values. The variable sampling rate compression circuit 42 codes the respective differential values in the horizontal direction successively in the variable sampling rate coding system, to transmit the same. The variable sampling rate decoding circuit 44 decodes original differential values on the basis of the outputted codes in the respective sampling points, thereby to store the same in the line buffer 47. In other words, the line buffer 47 stores decoded differential values of the respective sampling points on one horizontal scanning line. The respective differential values stored in the line buffer 47 are added with predictors for the respective sampling points by the adder circuit 45, to be processed as predictors for respective sampling points on a subsequent horizontal scanning line.

In the receiving area, the variable sampling rate decoding circuit 51 decodes original differential values of successively transmitted codes, whereby the differential values are stored in the line buffer 55. The differential values thus stored in the line buffer 55 are added with predictors from the predictive circuit 53 by the adder circuit 52, whereby original sampling values are restored and stored in the line buffer 56. In a similar manner, sampling values of respective sampling points on one horizontal scanning line are successively restored and outputted, to be stored in the line buffer 56. The sampling values of the respective sampling points on one horizontal scanning line are supplied to the adder circuit 52 as predictors for restoring respective sampling values on a subsequent horizontal scanning line.

Thus, in order to code respective sampling values on one horizontal scanning line, prediction is performed on the basis of the predictors stored in the line buffer 48 and the respective sampling values on the subsequent horizontal scanning line, thereby to intersect the preposition predictive direction (X axis) and the compression/expansion direction (Y axis) in the variable sampling rate system. In general, strong correlation remains in an axial direction orthogonal to the coordinate direction in which prediction is made in the plane pattern of preposition predictive errors, whereby vertical-striped bleeding appears in restored pictures or compression coding efficiency is lowered. However, the preposition predictive direction is intersected with the compression/expansion direction in the variable sampling rate coding system in the aforementioned embodiment, and hence errors in the aforementioned compression/expansion can be corrected in a direction in which correlation remains in the differential value pattern after preposition prediction, thereby to remarkably improve the picture quality. Further, the preposition predictive differential values are concentrated around zero, whereby the picture quality is improved to increase data compression efficiency.

Compressibility in the variable sampling predictive coding system is now described in comparison with the conventional system. The variable sampling rate coding system of 2.8 bit/pixel is substantially identical in picture quality to a preposition predictive DPCM system of 4.0 bit/pixel, and if original pictures are one-dimensionally compressed to an extent of 2.0 bit/pixel by the variable sampling rate coding system, outlines thereof are disturbed. However, according to the variable sampling rate predictive coding system, outlines are not disturbed even in an extent of about 1.0 bit/pixel, whereby pictures of good quality can be transmitted. Table 1 shows examples of quantization characteristics (4 bits) of the variable sampling predictive coding system. For example, when a sample is present between 24 and 47, the quantization level (code) is 11 and the coded sampling value is 32. The ranges of the samples are twice the preposition predictive differential values, and a picture of 8 bit/pixel is in the range of −512 to +511, whereas the frame memory 16 may be prepared by that of 8 bit/pixel on condition that the line buffer 48 is prepared by that of 10 bits. A 16-bit microcomputer is employed in the embodiment of the present invention, whereby computation is performed at a practical speed by signed integer arithmetic.

TABLE 1

| Quantization Level | Time Difference Value | Amplitude Difference Value | Amplitude of Sample |
|---|---|---|---|
| 0 | 1 | −256 | below −192 |
| 1 | 1 | −128 | −191 to −96 |
| 2 | 2 | −64 | −95 to −48 |
| 3 | 3 | −32 | −47 to −24 |
| 4 | 4 | −16 | −23 to −12 |
| 5 | 5 | −8 | −11 to −6 |
| 6 | 6 | −4 | −5 to −3 |
| 7 | 8 | 0 | −2 to 2 |
| 8 | 6 | 4 | 3 to 5 |
| 9 | 5 | 8 | 6 to 11 |
| 10 | 4 | 16 | 12 to 23 |
| 11 | 3 | 32 | 24 to 47 |
| 12 | 2 | 64 | 48 to 95 |
| 13 | 1 | 128 | 96 to 191 |
| 14 | 1 | 256 | over 192 |

Table 2 shows examples of other quantization characteristics, and when, for example, the quantization level is 7 and the amplitude difference value is 0, the time difference value is 2 and hence compressibility is low but the picture quality is improved. Compression can be performed to an extent of 3.0 bit/pixel in the quantization characteristics as shown in Table 2, whereby redundancy in picture quality is removed.

TABLE 2

| Code | Quantization Level | Time Difference Value | Amplitude Difference Value | Amplitude of Sample |
|---|---|---|---|---|
| 0 | 0 | 1 | −64 | below −64 |
| 1 | 1 | 1 | −32 | −63 to −32 |
| 2 | 2 | 1 | −16 | −31 to −16 |
| 3 | 3 | 1 | −8 | −15 to −8 |
| 4 | 4 | 1 | −4 | −7 to −4 |
| 5 | 5 | 1 | −2 | −3 to −2 |
| 6 | 6 | 2 | −1 | −1 |
| 7 | 7 | 2 | 0 | 0 |
| 8 | 8 | 2 | 1 | 1 |
| 9 | 9 | 1 | 2 | 2 to 3 |
| A | 10 | 1 | 4 | 4 to 7 |
| B | 11 | 1 | 8 | 8 to 15 |
| C | 12 | 1 | 16 | 16 to 31 |
| D | 13 | 1 | 32 | 32 to 63 |
| E | 14 | 1 | 64 | over 64 |

Figure 10:
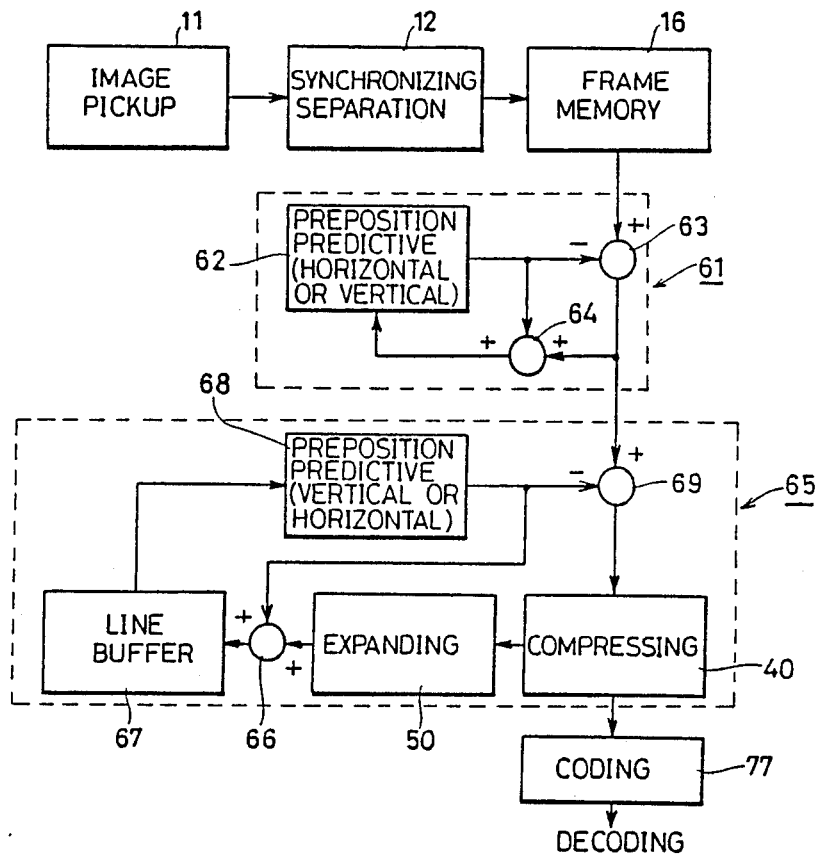
FIG. 10 is a schematic block diagram showing the essential part of a compression coding circuit included in another embodiment of the present invention.
Figure 12:
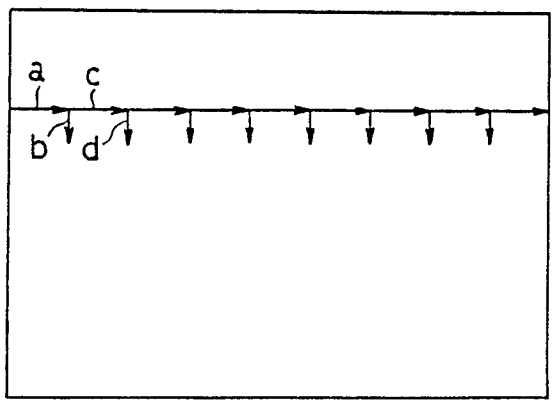
FIG. 12 is an illustration showing a manner of primarily preposition-predicting a horizontally scanned screen in the horizontal direction, secondarily preposition-predicting the same in the vertical direction and alternately repeating the said operations for variable sampling rate coding.
Figure 11:
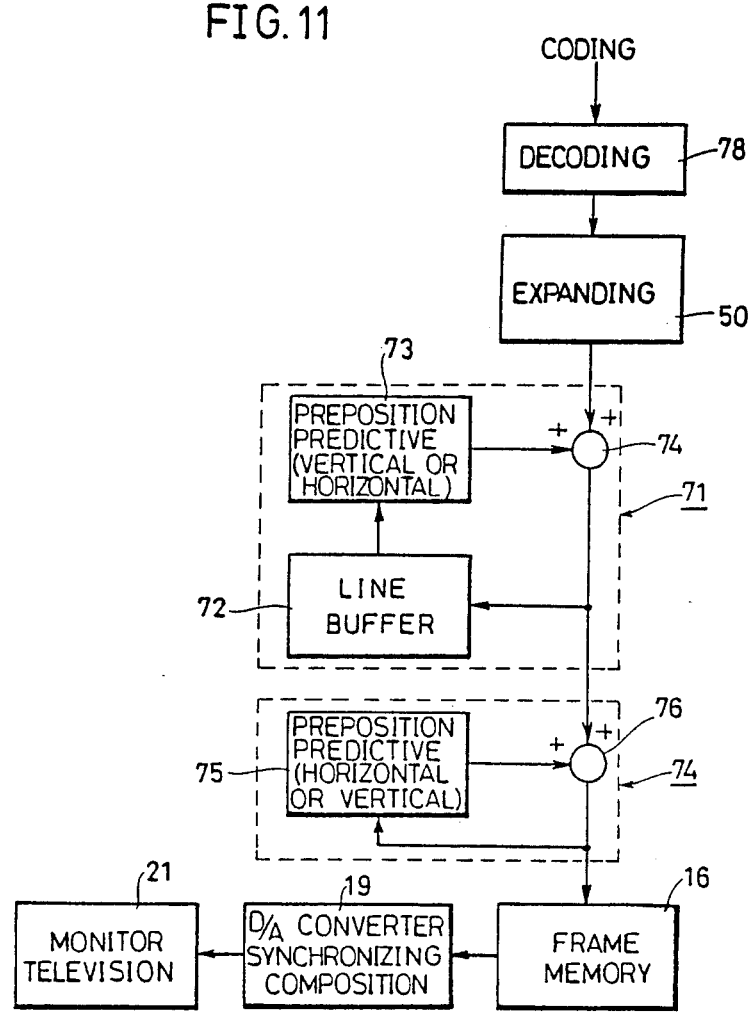
FIG. 11 is a schematic block diagram showing the essential part of an expansion decoding circuit included in this second embodiment of the present invention.

FIG. 10 is a schematic block diagram showing the essential part of a compression coding circuit according to another embodiment of the present invention, FIG. 11 is a schematic block diagram showing the essential part of an expansion decoding circuit and FIG. 12 is an illustration showing the manner of primarily preposition-predicting a horizontally scanned screen in the horizontal direction, secondarily preposition-predicting the same in the vertical direction and alternately repeating these operations thereby to perform variable sampling rate coding.

In the embodiment as shown in FIGS. 10 to 12, primary preposition prediction is first performed on a horizontal sampling value and secondary preposition prediction is then performed on a vertical sampling value and thereafter primary preposition prediction is performed on a subsequent horizontal sampling value and secondary preposition prediction is performed on a subsequent vertical sampling value.

In other words, an image pickup monochrome camera 11 outputs composite picture signals, from which synchronizing signals are separated by a synchronizing separation circuit 12 so that picture data are stored in a frame memory 16. The picture data are then read from the frame memory 16 to be supplied to a primary preposition predictive circuit 61, which is formed by a preposition predictive circuit 62, a subtraction circuit 63 and an adder circuit 64. The primary preposition predictive circuit 61 performs preposition prediction on a first sampling value a (FIG. 12) of picture data on horizontal scanning lines. The differential value obtained by this primary preposition prediction is supplied to a secondary preposition predictive circuit 65, which includes the aforementioned compression coding circuit 40 as shown in FIG. 5 and the expansion decoding circuit 50 as shown in FIG. 6 and is formed by an adder circuit 66, a line buffer 67, a preposition predictive circuit 68 and an adder circuit 69.

The secondary preposition predictive circuit 65 performs secondary preposition prediction of a vertical sampling value b as shown in FIG. 12. In other words, the subtraction circuit 69 finds a differential value between the said differential value of the primary preposition prediction obtained by the primary preposition predictive circuit 61 and a predictor from the preposition predictive circuit 68. This differential value is supplied to a compression coding circuit 40, which performs coding by the variable sampling rate coding system, with respect to the horizontal direction perpendicular to the vertical direction, on the basis of the differential value of the secondary preposition prediction to output the same. The codes thus outputted are converted by a code compression circuit 77 into transmission codes shown in Table 3 as hereinafter described, to be transmitted to a public telephone line.

On the other hand, data coded by the compression coding circuit 40 are supplied to an expansion decoding circuit 50, whereby vertical differential codes are decoded. Then the adder circuit 66 adds up the secondary preposition predictor from the preposition predictive circuit 68 and the differential value from the expansion decoding circuit 50 to store the same in the line buffer 67. Namely, the line buffer 67 stores a predictor for a subsequent vertical sampling value. Thereafter in a similar manner, the primary preposition predictive circuit 61 performs primary preposition prediction on a subsequent horizontal sampling value c as shown in FIG. 12 and the secondary preposition predictive circuit 65 performs secondary preposition prediction on a subsequent vertical sampling value d.

As shown in FIG. 11, the transmission codes as transmitted to the receiving are restored to the original codes by a code expansion circuit 78 to be supplied to the aforementioned expansion decoding circuit 50 as shown in FIG. 6. The expansion decoding circuit 50 restores the transmitted codes to the aforementioned differential values of the secondary preposition prediction, which is supplied to a secondary preposition predictive circuit 71. This secondary preposition predictive circuit 71 is formed by a line buffer 72, a preposition predictive circuit 73 and an adder circuit 74. The adder circuit 74 adds up the differential value of the secondary preposition prediction and the predictor from the preposition predictive circuit 73, thereby to decode the differential value of the primary preposition prediction. The differential value of the primary preposition prediction is supplied to the primary preposition predictive circuit 74, while being stored in the line buffer 72. The differential value of the primary preposition prediction as stored in the line buffer 72 is supplied to the preposition predictive circuit 73 as a predictor for predicting a differential value of the subsequent preposition prediction.

The primary preposition predictive circuit 74 is formed by a preposition predictive circuit 75 and an adder circuit 76. The adder circuit 76 restores an original sampling signal on the basis of the differential value of the primary preposition prediction supplied from the secondary preposition predictive circuit 71 and the predictor from the preposition predictive circuit 75. The restored sampling signal is stored in the frame memory 16. The restored sampling signal is then read from the frame memory 16 and converted by a D-A converter 19 into an analog signal to which a synchronizing composite circuit 20 adds a synchronizing signal so that the same is displayed on a monitor television 21.

Table 3 shows examples of transmission codes converted from compressed codes by a code compression circuit 77. In Tables 1 and 2, the amplitude difference value is 0 when the quantization level is 7, and hence a transmission code for continuous four codes of quantization level 7 is indicated by F1 in units of 8 bits (hexadecimal expression) in the case where one code is equal to zero. In a similar manner, a transmission code is indicated by F9 for a continuous quantization level 7 by one line in the compression/expansion direction in the variable sampling rate coding system. These transmission codes are restored to the original codes by the code expansion circuit 78. Thus, the codes as shown in Tables 1 and 2 can be further compressed by employing the transmission codes as shown in Table 3.

Even if the number of continuously transmitted codes of the quantization level 7 is less than three, quantization levels (0 to E in hexadecimal expression) can be nested one by one for respective high-order four bits and low-order four bits of 8-bit transmission code thereby to combine the transmission codes as shown in Table 3, whereby data on two or more picture elements can be included in one character code to improve compression efficiency.

TABLE 3

| Transmission Code (8 bits) | Meaning |
| --- | --- |
| F0 | line termination code |
| F1 | 4 codes zero |
| F2 | 8 codes zero |
| F3 | 12 codes zero |
| F4 | 16 codes zero |
| F5 | 20 codes zero |
| F6 | 24 codes zero |
| F7 | 28 codes zero |
| F8 | 32 codes zero |
| F9 | 1 line zero |
| FA | 2 lines zero |
| FB | 3 lines zero |
| FC | 4 lines zero |
| FD | 5 lines zero |
| FE | 6 lines zero |
| FF | frame termination code |

With respect to the foregoing description, a value of about 0.975 times the preposition predictor may be processed in the primary preposition prediction as a current predictor to decode a differential value for the same, and a value of about 0.977 times the predictor for a sampling point in a continued horizontal scanning line may be processed as a current predictor similarly in the second preposition prediction. On the other hand, in a plane predictive system for two-dimensional prediction, values exceeding that of 0.379 times the preposition predictor and that of 0.617 times the predictor for a sampling point in a continued horizontal scanning line are processed as current predictors. Table 4 shows examples of differential values of the primary preposition prediction, the secondary preposition prediction and the plane prediction with respect to 4-bit coding (15 partitions) and 3-bit coding (7 partitions). As obvious from Table 4, distribution centers of the differential values of the primary preposition prediction are concentrated in the plus side while those of the secondary preposition prediction are distributed around zero. Further, the secondarily predicted differential values are remarkably higher in degree of concentration to zero than the plane-predicted differential values. This is because prediction is doubly performed in the secondary preposition prediction to highly improve prediction coefficient and remove correlation, while merely two-dimensional prediction is performed in the plane prediction.

TABLE 4

| | Difference in Primary Prediction | Difference in Secondary Prediction | Difference in Plane Prediction |
|---|---|---|---|
| | 4-bit Coding | 4-bit Coding | 4-bit Coding |
| −64 | 29. | 8. | 136. |
| −32 | 698. | 75. | 505. |
| −16 | 1670. | 668. | 2256. |
| −8 | 2069. | 2614. | 3491. |
| −4 | 2482. | 6012. | 4988. |
| −2 | 2510. | 9534. | 6585. |
| −1 | 1861. | 7180. | 5507. |
| 0 | 7192. | 12751. | 11149. |
| 1 | 3290. | 7362. | 7125. |
| 2 | 8151. | 9645. | 9558. |
| 4 | 17360. | 6209. | 7090. |
| 8 | 12727. | 2691. | 3753. |
| 16 | 3678. | 696. | 2157. |
| 32 | 1416. | 84. | 784. |
| 64 | 407. | 8. | 454. |
| | 3-bit Coding | 3-bit Coding | 3-bit Coding |
| −32 | 723. | 82. | 639. |
| −8 | 3739. | 3282. | 5747. |
| −2 | 4992. | 15546. | 11573. |
| 0 | 12343. | 27293. | 23781. |
| 2 | 25511. | 15854. | 16648. |
| 8 | 16405. | 3387. | 5910. |
| 32 | 1823. | 92. | 1238. |

Incidentally, the secondary prediction as shown in FIGS. 5 and 6 is made by directing a primary prediction step in a horizontal direction into a vertical direction based on a prediction value stored in the line buffer 48. In this case, the primary prediction of a single picture element in a horizontal direction is made to a vertical direction in the lump and a compression/expansion in a variable sampling rate coding system is made in a vertical direction. Therefore, an error due to compression/expansion in the vertical direction is corrected in a primary prediction loop in a horizontal direction.

On the other hand, as is conventional, in a scanning method in which only one line is primarily predicted in a horizontal direction and then, based on such primary prediction, the secondary prediction between two lines in the vertical direction is made, errors due to compression/expansion are not corrected in the primary prediction step as in the present invention. Thus, according to the present invention, even in the secondary prediction, the structure shown in FIGS. 5 and 6 can achieve a suitable secondary prediction by a scanning operation as shown in FIG. 9.

In addition, in the variable sampling rate coding system, in case where the quality of picture is preferred to compression rate, four bits per picture are compressed as identical to DPCM if and when the values of time difference illustrated in the above described Tables 1 and 2 are all made to be "1". However, in the example shown in FIGS. 5 and 6, since the scanning method shown in FIG. 9 is used, a compression/expansion error is less and quality of picture can be enhanced, as compared with the known-secondary DPCM (composite difference of horizontal and vertical direction).

Figure 13:
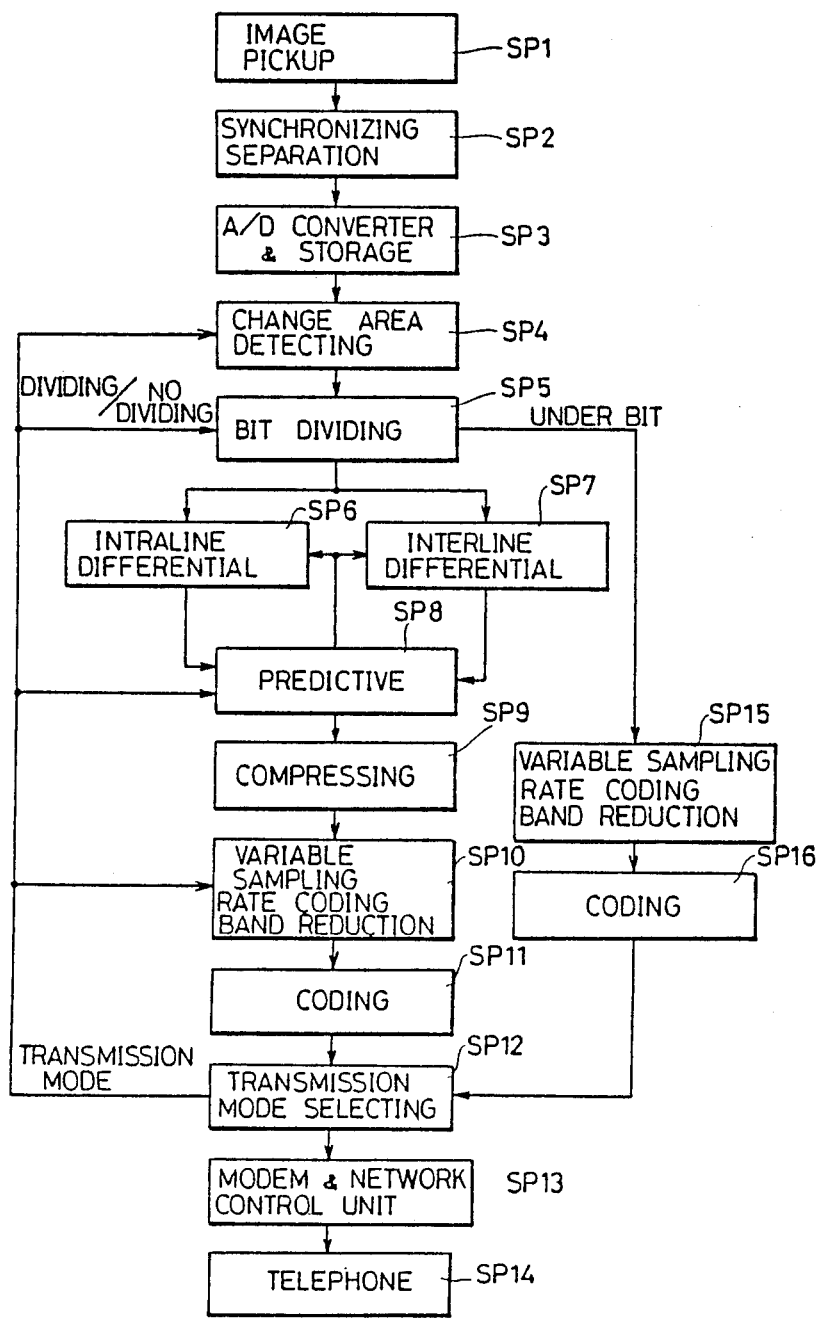
FIG. 13 is a flow chart of transmission processing procedures in still another embodiment of the present invention.
Figure 14:
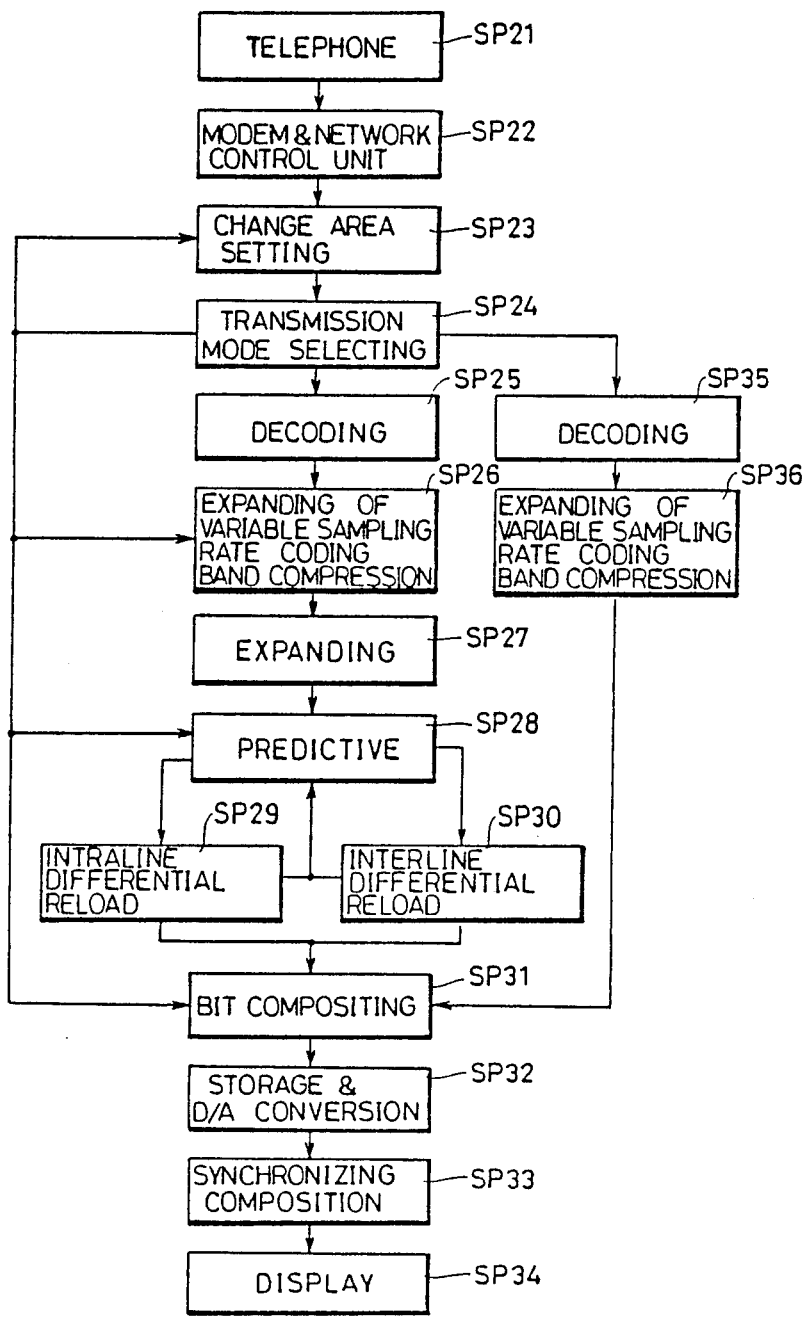
FIG. 14 is a flow chart showing receiving processing procedures in this third embodiment of the present invention.

FIG. 13 is a flow chart showing transmission processing procedures in still another embodiment of the present invention, and FIG. 14 is a flow chart showing receiving processing procedures.

In the embodiment as shown in FIGS. 13 and 14, detection is made on areas in which picture data and other picture data before the picture data are changed to divide a plurality of bits of picture data in the detected changed areas into high-order M bits and low-order (N−M) bits, thereby to code the high-order M-bit picture data successively by one screen and transmit by the variable sampling rate coding system the same and thereafter transmit the low-order picture data of (N−M) bits, so as to improve band compression efficiency.

In the transmission area, an image-pickup monochrome camera 11 generates composite picture signals at a step SP1, and a synchronizing separation circuit 12 separates synchronizing signals from the same at a step SP2. Then, at a step SP3, an A-D converter 14 converts the picture signals from which the synchronizing signals are separated into digital signals to store the same in a frame memory 16. At a step SP4, a CPU 22 detects areas in which picture data are changed from those in immediate front frames in the picture data stored in the frame memory 16. At a step SP5, the CPU 22 divides a plurality of bits of picture data in the changed areas into high-order M bits and low-order (N−M) bits. At steps SP6 and SP8, the CPU 22 performs preposition prediction on respective sampling points on scanning lines included in the changed areas, and at steps SP9 and SP10, it performs variable sampling rate compression of differential values obtained by the preposition prediction, to code the same at a step SP11. Then, at a step SP12, the CPU 22 transmits the coded data to a public telephone line through a modem 27 and a network control unit 28, if a variable sampling rate coding mode is selected.

Thus, preposition prediction is performed on the respective sampling points on the horizontal scanning lines, the differential values of which are compression-coded and successively transmitted. Then interline differentials of high-order M bits are found for the picture data in the changed areas. In other words, prediction is performed with respect to sampling points on subsequent scanning lines, thereby to perform compression coding of the differential values and to transmit the same. After the codes of high-order M bits for one screen are completely transmitted, the codes of the low-order (N−M) bits are compressed in the variable modem interface 25, the modem 27, the network control unit 28 and the public telephone line.

In receiving, picture data transmitted through the public telephone line are inputted in the network control unit 28. The picture data are further inputted in the variable sampling rate coding/decoding circuit 30 through the network control unit 28, the modem 27, the modem interface 25 and the data bus 32, to be decoded to the original picture data. The decoded picture data are stored in the frame memory 16 through the data selector 15. The picture data thus stored in the frame memory 16 are read on the basis of the address signals outputted from the timing circuit 13, to be supplied to the D-A converter 19. The D-A converter 19 converts the picture data into analog signals, to supply the same to a synchronizing composite circuit 20. The synchronizing composite circuit 20 adds synchronizing signals to the analog-converted picture signals to supply the same to a monitor television 21, which thereby displays pictures based on the received picture data.

FIG. 5 is a schematic block diagram showing a compression coding circuit included in the embodiment of the present invention, and FIG. 6 is a schematic block diagram showing an expansion coding circuit also included in the same.

A compression coding circuit 40 and an expansion coding circuit 50 shown in FIGS. 5 and 6 are included in the aforementioned variable sampling rate coding/decoding circuit 30 as shown in FIG. 4 respectively. Description is now made on structure of the compression coding circuit 40 as shown in FIG. 5. The picture data read from the aforementioned frame memory 16 as shown in FIG. 4 are supplied as sampling values to a subtraction circuit 41. The subtraction circuit 41 performs subtraction of the inputted sampling values and predictors from a predictive circuit 43, thereby to supply differential values thereof to a variable sampling rate compression circuit 42. This variable sampling rate compression circuit 42 is formed by a line buffer 421 and a variable sampling rate coding circuit 422.

The line buffer 421 stores the differential values which are outputted from the subtraction circuit 41, while the variable sampling rate coding circuit 422 codes the differential values stored in the line buffer 421 by the variable sampling rate coding system. The coded data are outputted to the aforementioned data bus 32 as shown in FIG. 4, as well as supplied to a variable sampling rate decoding circuit 44. This variable sampling rate decoding circuit 44 is adapted to decode the coded data to the original differential values to store the same in the line buffer 47, for decoding differential values by one line. The decoded differential values are supplied to an adder circuit 45, which in turn adds up the decoded differential values and predictors supplied from the predictive circuit 43 through the line buffer 48, thereby to supply the added values as predictors for subsequent sampling points to the predictive circuit 43.

Description is now made on the expansion decoding circuit 50 with reference to FIG. 6. This expansion decoding circuit 50 is adapted to decode codes transmitted in receiving from the public telephone line to sampling values. Therefore, the expansion decoding circuit 50 includes a variable sampling rate decoding circuit 51, an adder circuit 52, a predictive circuit 53 and line buffers 55 and 56. The variable sampling rate decoding circuit 51 decodes inputted codes to differential values. The differential values thus decoded by the variable sampling rate decoding circuit 51 are supplied to the adder circuit 52 through the line buffer 55. The adder circuit 52 is supplied with predictors from the predictive circuit 53, and adds up the decoded differential values and the predictors thereby to output sampling values while storing the same in the line buffer 56.

FIGS. 7 and 8 are waveform diagrams for illustrating operations of the embodiment of the present invention.

Operations of the compression coding circuit 40 and the expansion decoding circuit 50 are now described with reference to FIGS. 5 to 8. The frame memory 16 stores picture data obtained by digitization of picture signals as shown in FIG. 7. Such picture data are coded by the compression coding circuit 40. In other words, sampling values of the picture data are subjected to subtraction by the subtractor 41 with predictors from the predictive circuit 43, whereby obtained differential values are stored in the line buffer 421. The variable sampling rate coding circuit 422 defines relations between sampling periods and the sampling values in the form of triangles as shown in FIG. 8, thereby to code differences indicated by arrows and transmit the same. These codes are decoded to the original differential values by the variable sampling rate decoding circuit 44 to be stored in the line buffer 47. The differential values thus stored in the line buffer 47 are added with the predictors from the predictive circuit 43 by the adder circuit 45, to produce predictors for subsequent sampling points.

In the receiving area, the variable sampling rate decoding circuit 51 of the expansion decoding circuit 50 as shown in FIG. 6 decodes the coded data, whereby the original differential values are restored and stored in the line buffer 55. The differential values thus stored in the line buffer 55 are added with predictors from the predictive circuit 53 by the adder circuit 52, so that original picture data are decoded and outputted. The decoded data are stored in the line buffer 56, to be supplied to the adder circuit 52 as predictors for decoding subsequent codes by the predictive circuit 53.

Thus, in the compression coding circuit 40 as shown in FIG. 5, the variable sampling rate compression circuit 42 and the variable sampling rate decoding circuit 44 are inserted in the predictive loop thereof, whereby errors following compression and expansion are included in predictive differential values in the variable sampling rate coding system and transmitted. Therefore, the errors in the variable sampling rate coding system are automatically corrected when samples are restored utilizing the differential values in the receiving area.

FIG. 9 is an illustration showing a manner of horizontally preposition-predicting a screen scanned in a horizontal direction thereby to vertically perform variable sampling rate coding of predictive errors arranged in the vertical direction.

Description is now made on an embodiment for transmitting two-dimensional plane pictures as shown in FIG. 9 by the compression coding circuit 40 as shown in FIG. 5. The predictive circuit 43 of the compression coding circuit 40 as shown in FIG. 5 successively supplies the subtraction circuit 41 with predictors corresponding to respective sampling points on one horizontal scanning line, while storing the same in the line buffer 48. The subtraction circuit 41 successively subtracts predictors from respective sampling values of picture data on one horizontal scanning line thereby to output differential values. The variable sampling rate compression circuit 42 codes the respective differential values in the horizontal direction successively in the variable sampling rate coding system, to transmit the same. The variable sampling rate decoding circuit 44 decodes original differential values on the basis of the outputted codes in the respective sampling points, thereby to store the same in the line buffer 47. In other words, the line buffer 47 stores decoded differential values of the respective sampling points on one horizontal scanning line. The respective differential values stored in the line buffer 47 are added with predictors for the respective sampling points by the adder circuit 45, to be processed as predictors for respective sampling points on a subsequent horizontal scanning line.

In the receiving area, the variable sampling rate decoding circuit 51 decodes original differential values of successively transmitted codes, whereby the differential values are stored in the line buffer 55. The differential values thus stored in the line buffer 55 are added with predictors from the predictive circuit 53 by the adder circuit 52, whereby original sampling values are restored and stored in the line buffer 56. In a similar manner, sampling values of respective sampling points on one horizontal scanning line are successively restored and outputted, to be stored in the line buffer 56. The sampling values of the respective sampling points on one horizontal scanning line are supplied to the adder circuit 52 as predictors for restoring respective sampling values on a subsequent horizontal scanning line.

Thus, in order to code respective sampling values on one horizontal scanning line, prediction is performed on the basis of the predictors stored in the line buffer 48 and the respective sampling values on the subsequent horizontal scanning line, thereby to intersect the preposition predictive direction (X axis) and the compression/expansion direction (Y axis) in the variable sampling rate system. In general, strong correlation remains in an axial direction orthogonal to the coordinate direction in which prediction is made in the plane pattern of preposition predictive errors, whereby vertical-striped bleeding appears in restored pictures or compression coding efficiency is lowered. However, the preposition predictive direction is intersected with the compression/expansion direction in the variable sampling rate coding system in the aforementioned embodiment, and hence errors in the aforementioned compression/expansion can be corrected in a direction in which correlation remains in the differential value pattern after preposition prediction, thereby to remarkably improve the picture quality. Further, the preposition predictive differential values are concentrated around zero, whereby the picture quality is improved to increase data compression efficiency.

Compressibility in the variable sampling predictive coding system is now described in comparison with the conventional system. The variable sampling rate coding system of 2.8 bit/pixel is substantially identical in picture quality to a preposition predictive DPCM system of 4.0 bit/pixel, and if original pictures are one-dimensionally compressed to an extent of 2.0 bit/pixel by the variable sampling rate coding system, outlines thereof are disturbed. However, according to the variable sampling rate predictive coding system, outlines are not disturbed even in an extent of about 1.0 bit/pixel, whereby pictures of good quality can be transmitted. Table 1 shows examples of quantization characteristics (4 bits) of the variable sampling predictive coding system. For example, when a sample is present between 24 and 47, the quantization level (code) is 11 and the coded sampling value is 32. The ranges of the samples are twice the preposition predictive differential values, and a picture of 8 bit/pixel is in the range of −512 to +511, whereas the frame memory 16 may be prepared by that of 8 bit/pixel on condition that the line buffer 48 is prepared by that of 10 bits. A 16-bit microcomputer is employed in the embodiment of the present invention, whereby computation is performed at a practical speed by signed integer arithmetic.

TABLE 1

| Quantization Level | Time Difference Value | Amplitude Difference Value | Amplitude of Sample |
|---|---|---|---|
| 0 | 1 | −256 | below −192 |
| 1 | 1 | −128 | −191 to −96 |
| 2 | 2 | −64 | −95 to −48 |
| 3 | 3 | −32 | −47 to −24 |
| 4 | 4 | −16 | −23 to −12 |
| 5 | 5 | −8 | −11 to −6 |
| 6 | 6 | −4 | −5 to −3 |
| 7 | 8 | 0 | −2 to 2 |
| 8 | 6 | 4 | 3 to 5 |
| 9 | 5 | 8 | 6 to 11 |
| 10 | 4 | 16 | 12 to 23 |
| 11 | 3 | 32 | 24 to 47 |
| 12 | 2 | 64 | 48 to 95 |
| 13 | 1 | 128 | 96 to 191 |
| 14 | 1 | 256 | over 192 |

Table 2 shows examples of other quantization characteristics, and when, for example, the quantization level is 7 and the amplitude difference value is 0, the time difference value is 2 and hence compressibility is low but the picture quality is improved. Compression can be performed to an extent of 3.0 bit/pixel in the quantization characteristics as shown in Table 2, whereby redundancy in picture quality is removed.

TABLE 2

| Code | Quantization Level | Time Difference Value | Amplitude Difference Value | Amplitude of Sample |
|---|---|---|---|---|
| 0 | 0 | 1 | −64 | below −64 |
| 1 | 1 | 1 | −32 | −63 to −32 |
| 2 | 2 | 1 | −16 | −31 to −16 |
| 3 | 3 | 1 | −8 | −15 to −8 |
| 4 | 4 | 1 | −4 | −7 to −4 |
| 5 | 5 | 1 | −2 | −3 to −2 |
| 6 | 6 | 2 | −1 | −1 |
| 7 | 7 | 2 | 0 | 0 |
| 8 | 8 | 2 | 1 | 1 |
| 9 | 9 | 1 | 2 | 2 to 3 |
| A | 10 | 1 | 4 | 4 to 7 |
| B | 11 | 1 | 8 | 8 to 15 |
| C | 12 | 1 | 16 | 16 to 31 |
| D | 13 | 1 | 32 | 32 to 63 |
| E | 14 | 1 | 64 | over 64 |

FIG. 10 is a schematic block diagram showing the essential part of a compression coding circuit according to another embodiment of the present invention, FIG. 11 is a schematic block diagram showing the essential part of an expansion decoding circuit and FIG. 12 is an illustration showing the manner of primarily preposition-predicting a horizontally scanned screen in the horizontal direction, secondarily preposition-predicting the same in the vertical direction and alternately repeating these operations thereby to perform variable sampling rate coding.

In the embodiment as shown in FIGS. 10 to 12, primary preposition prediction is first performed on a horizontal sampling value and secondary preposition pre-